United States Patent [19]

Albright

[11] 3,748,658
[45] July 31, 1973

[54] DUPLEX VISOR

[76] Inventor: Richard W. Albright, 11060 McBroom St., Sunland, Calif. 91040

[22] Filed: Aug. 9, 1971

[21] Appl. No.: 170,125

[52] U.S. Cl. .................................................. 2/10
[51] Int. Cl. ............................................ A61f 9/04
[58] Field of Search ..................... 2/3, 5, 6, 8, 9, 2/10

[56] References Cited
UNITED STATES PATENTS
2,138,086  11/1938  Blodjer ..................................... 2/10
D168,057  10/1952  Margwarth ........................ 2/10 UX
3,189,918  6/1965  Hiatt et al. ................................ 2/9

*Primary Examiner*—James R. Boler
*Attorney*—Matthew P. Lynch

[57] ABSTRACT

An improved duplex visor for a helmet, the visor having a transparent clear portion and a transparent light attenuating portion. The visor is adapted to be pivotally moved from a position in the field of vision of the wearer to a position in spaced conformity to the crown of the helmet and further adapted to be easily rotated, whereby either the clear or the attenuating portions can be positioned in the field of vision in order to accommodate a full range of light conditions.

5 Claims, 2 Drawing Figures

PATENTED JUL 31 1973 3,748,658

RICHARD W. ALBRIGHT
INVENTOR

By Matthew P. Lynch
ATTORNEY

DUPLEX VISOR

BACKGROUND OF THE INVENTION

This invention relates to a novel duplex visor means for protective headgear. Protective headgear with visors are commonly worn by motorcyclists and other persons whose activities require shielding of the eyes against relatively intense light or glare, wind, airborne particles and other external conditions which tend to impair vision. However, the external conditions which create the need for such eye protection generally vary. For example, the light conditions to which a motorcyclist is exposed may vary between the extremes of intense sunlight or glare and the darkness of night. During all such light conditions, however, the need to protect the eyes from the wind and airborne particles remains constant. On other occasions it may be desirable or necessary for the motorcyclist to wear the protective headgear without having the visor positioned in front of his eyes, such as when smoking or talking when riding at reduced speeds or resting.

In view of the above, it is apparent that the ideal visor for protective headgear is one which permits easy adjustment of its effective light transmission or light attenuating characteristics to accommodate the full range of light conditions between the extremes of bright sunlight and evening darkness. The ideal visor will also be capable of easily and quickly retracting out of the wearer's field of vision without having to remove the protective headgear or the entire visor assembly. All of the above must be capable of being accomplished in an inexpensive and efficient manner without complicated mechanisms which might tend to jam or rust due to constant exposure to the elements.

Motorcycling, in addition to requiring eye protection, also requires head protection; therefore, motorcyclists commonly wear protective headgear or helmets. In many states the use of helmets is mandatory by legislation. However, the helmets that are available at the present time do not provide for protection of the motorcyclist's eyes; therefore, many wearers, in addition to wearing a helmet, also wear separate goggles which cover the eyes and protect them from the wind and foreign objects. Goggles, howeveer, do not possess the ability to attentuate light and a goggle that may be worn in bright sunlight would not be suitable in the evening darkness. There are also currently on the market expensive helmets with visors which are incorporated into the helmets at the time of manufacture. These visors consist of a plurality of panes, both clear and tinted and they are alternately brought before the eyes, depending upon light conditions. While such built-in visors would solve the same problems solved by the present invention, they have a number of inherent problems, such as weight, complexity of the visor retracting mechanism, the susceptability of the mechanism to jam due to exposure to the elements, complexity of operation, inability to be adapted to existing off-the-shelf helmets and obviously, cost.

SUMMARY OF THE INVENTION

The present invention overcomes the aforementioned problems by providing a duplex visor means having a transparent light attenuating portion and a transparent optically clear portion. The duplex visor is adapted to be affixed to all existing helmets by a simple fastening means which enables the visor to be brought into operating position in the field of vision of the wearer and to be pivotally moved to a non-operative position about the crown of the helmet. When in a non-operative position the visor lies in complementary juxtaposition to the surface contour of the helmet and provides a minimum of wind resistance. When it is desired to attenuate the light reaching the eyes of the wearer the fasteners are easily and quickly undone and the duplex visor is reversed so that the same visor can be used for all lighting conditions.

DESCRIPTION OF THE PREFERRED EMBODIMENT

Figure 1:
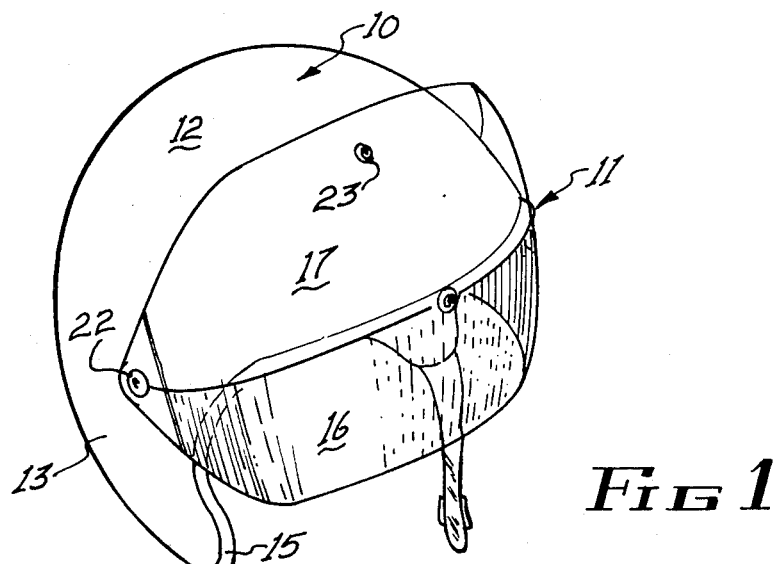
FIG. 1 is a perspective view of the helmet with the duplex visor in position with its light attenuating portion in operating position.
Figure 2:
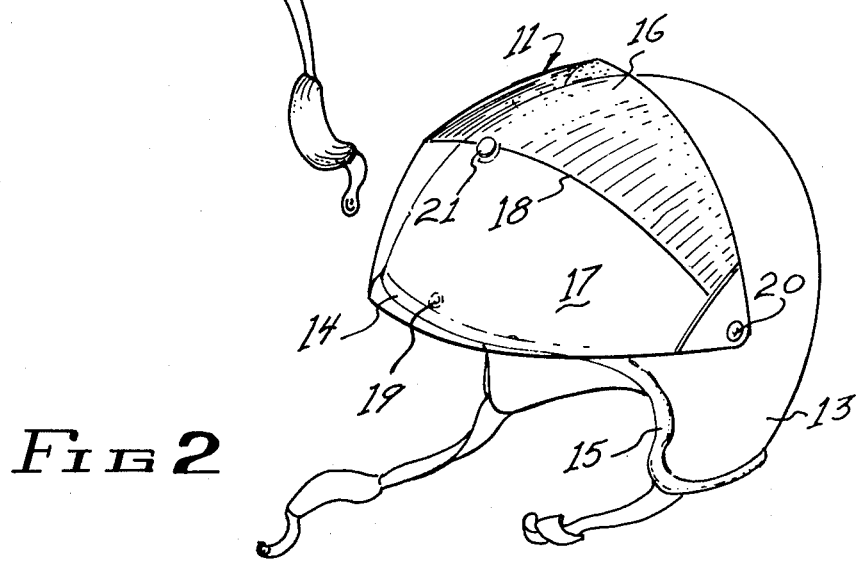
FIG. 2 is a perspective view of the visor in its non-operative position with the light attenuating and clear portions reversed.

Referring now to the drawings, wherein like reference numbers designate like or corresponding parts throughout the several views, there is shown in FIGS. 1 and 2 a helment 10 having a duplex visor means 11 thereon. The helmet 10 is of conventional construction and accordingly need not be described in detail; however, it is of a generally semispherical configuration having a crown portion 12 and depending side lobes 13. The front of the crown projects forwardly of the side lobes and defines a downwardly, forwardly arching crown edge 14 which extends horizontally across the helmet just above the level of the wearer's eyes and merges at its ends with the front edges 15 of the side lobes 13. The helmet 10 has a front face opening which is bounded by the crown edge 14 and the side lobe front edges 15. It will be understood that suitable means, such as a chin strap, will be provided for retaining the helmet on the wearer's head.

The primary contribution of the present invention resides in the unique construction and arrangement of the duplex visor 11. The duplex visor 11 consits of a light attenuating transparent semispherical portion 16 and a clear transparent semi-spherical portion 17. The portions 16 and 17 are preferably mirror images of one another and therefore, symmetrical about circumferential centerline 18, along which the light attenuating portion 16 joins the clear portion 17. While the light attenuating portion 16 and the clear portion 17 are described as being semispherical, such designation is intended and interpreted to encompass a hollow geometrical figure whose surface is at all points equidistant from its center as would be generated by revolving a semi-circle about its diameter and a spheroid wbose surface configuration would be as generated by revolving an ellipse about either of its two axes. Obviously the closer the surface configuration of the visor 11 is to a sphere, the greater is its optical clarity and the closer the configuration is to a spheriod, the greater is its reduction of wind resistance. There is a point between the spherical and spheroid configurations where the optimum optical clarity and minimum wind resistance is achieved while still enabling the visor to be retracted in a manner hereinafter described. The radius of the duplex visor 11 is slightly greater than the radius of the crown 12 of the helmet 10, in order that the visor can be retracted from the field of vision to a position in spaced relationship to the crown 12 of the helmet 10 and additionally to provide a plenum between the visor and the wearer's face. A major problem with existing visors is the heat build up between the visor and the wearer's face; therefore, it is desirable to have the visor spaced away from the helmet in order to allow air to flow through the plenum and replace the heated air with cooler air and still more desirable to reduce the heat build up by utilization of the light attenuating characteristics of the duplex visor.

It will be obvious to anyone skilled in the art to which this invention pertains that the light attenuating portion 16 and the clear portion 17, can be chemically bonded together along the centerline 18 or mechanically secured together or be constructed from an integral clear piece of material and then tinted, polarized or otherwise treated as desired.

Disposed centrally of the helmet 10 adjacent the crown edge 14 is a fastener means 19, such as a snap fastener. A fastener means 20 is also secured to each side lobe 13 along a common diametric axis equidistant from the fastener means 19 along the crown edge 14.

Disposed along the circumferential centerline 18 of the duplex visor 10 substantially centrally thereof and complementary to the fastener 19, is a fastener means 21 which is adapted to detachably connect to the fastener 19. Another fastener means 22 is secured to each outer tapered edge of the duplex visor along the centerline 18 equidistant from the fastener means 21. The fastener means 22 are adapted to be complementary to and releasably secured to the fastener means 20 located on the lobes 13 of the helmet 10. The fastener means 20 and 22 are of the type which permit pivotal movement of one relative to the other when they are interconnected.

In operation the fastener means 22 of the visor 11 are connected to their respective fastener means 20 on the side lobes 13 so that the tapered ends of the visor 11 along the centerline 18 overlap a portion of the side lobes 13. When the fasteners 20 and 22 are connected the visor 11 is capable of being pivoted thereabout from a position in front of the face opening as shown in FIG. 1 to a position in spaced complementary relationship to the crown 12 of the helmet. When it is desired to protect the eyes of the wearer from dirt, dust and airborne particles the visor 11 is pivoted about the fasteners 20 and 22 until the centerline 18 is complementary to the crown edge 14 and the fastener 21 is complementary to the fastener 19. When the visor 11 is in its desired position the fasteners 19 and 21 are connected, thereby holding the visor 11 in position. During bright daylight it is desirable to position the visor so that the light attenuating portion 16 is in front of the eyes to protect them from the glare in addition to the airborne particles and to reduce the heat buildup in the plenum. Upon dusk, however, the light attenuating portion 16 tends to attenuate the existing light to a point which limits visibility and the optically clear portion 17 should be utilized. In order to position the clear portion 17 in front of the wearer's eyes, the fasteners 19 and 21, and 20 and 22 are disconnected and the visor 11 is rotated 180° about an axis normal to its centerline 18 until the clear portion 17 is below the centerline and the light attenuating portion 16 above the centerline. Then the fasteners 20 and 22 and 19 and 21 are again connected to hold the visor in position.

As mentioned hereinbefore, there are times when it is desirable to keep the entire face opening clear and therefore, the visor must be pivoted to a position in complementary spaced relationship to the crown of the helmet. In order to move the visor 11 out of the field of vision, the fasteners 19 and 21 are disconnected and the entire visor 11 is pivoted about the fasteners 20 and 22 until the fastener 21 is complementary to a fastener 23, which is disposed centrally of the crown 12 of the helmet 10. When the visor 11 is in position away from the face opening the fastener 21 is connected to the fastener 23, thereby holding the visor in spaced relationship to the crown 12 of the helmet 10 until it is again desired to pivot the clear or light attenuating portion down in front of the field of vision of the wearer.

The duplex visor 11 may be constructed from any one of a number of plastic materials, preferably laminated to resist shattering upon impact and scratching and the light attenuating means, whether it be by tinting, polarization or by application of a reflective coating, should be stable and color fast; however, the type of material from which the visor is constructed and the method and type of attenuating is not of importance in the present invention.

From a detailed consideration of this description, it will be apparent to those skilled in the art that this invention may be employed in a number of different ways through the use of routine skill in this field. For this reason, the present invention is not to be considered as being limited except by the appended claims defining the invention.

I claim:

1. In a helmet having a crown and depending side lobes defining a face opening, a duplex visor comprising:
    a transparent semispherical section having a light attenuating portion and a clear portion, said portions being symmetrical about a circumferential centerline through said semi-spherical section;
    fastener means secured directly to said semispherical section along said circumferential centerline and equidistant from the midpoint thereof; and
    fastener means secured to the side lobes of said helmet complementary to said visor fasteners, said helmet fasteners adapted to pivotally connect to said visor fasteners.

2. A duplex visor in accordance with claim 1, wherein said semispherical section has a radius greater than the radius of said crown.

3. A duplex visor in accordance with claim 1, further comprising:
    first fastener means secured to said crown adjacent said face opening; and
    second fastener means secured to said visor along the circumferential centerline in complementary relationship to said first fastener means, whereby said visor is adapted to be secured to said helmet with one portion of said visor in juxtaposition to said face opening.

4. A duplex visor in accordance with claim 3, further comprising a fastener means secured to the crown of said helmet above and co-planar to said first fastener means in complementary relationship to said second fastener means whereby said visor is adapted to be secured to said helmet in spaced complementary relationship to the crown of said helmet adjacent to said face opening.

5. A duplex visor in accordance with claim 1, wherein said fastener means secured to said semispherical section along said circumferential centerline and equidistant from the midpoint are fuctionally identical.

* * * * *